United States Patent
Mazumder et al.

(10) Patent No.: US 12,470,579 B2
(45) Date of Patent: Nov. 11, 2025

(54) SYSTEM AND METHOD FOR IMPROVING DEVICE SECURITY BASED ON OPTICAL ABSORPTION SPECTROSCOPY AND ARTIFICIAL INTELLIGENCE

(71) Applicant: Bank of America Corporation, Charlotte, NC (US)

(72) Inventors: Shahadat Hossain Mazumder, Charlotte, NC (US); Maneesh Kumar Sethia, Hyderabad (IN); Abhijit Behera, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 263 days.

(21) Appl. No.: 18/459,933

(22) Filed: Sep. 1, 2023

(65) Prior Publication Data
US 2025/0080557 A1   Mar. 6, 2025

(51) Int. Cl.
*H04L 9/40* (2022.01)
*G01J 3/443* (2006.01)

(52) U.S. Cl.
CPC .......... *H04L 63/1425* (2013.01); *G01J 3/443* (2013.01)

(58) Field of Classification Search
CPC ............................. H04L 63/1425; G01J 3/443
See application file for complete search history.

(56) References Cited

U.S. PATENT DOCUMENTS

| | | | |
|---|---|---|---|
| 7,070,112 B2 | 7/2006 | Beenau et al. | |
| 7,623,295 B2 | 11/2009 | Sabeta | |
| 7,693,790 B2 | 4/2010 | Lawlor et al. | |
| 8,186,598 B2 | 5/2012 | Faenza, Jr. | |
| 9,489,670 B2 | 11/2016 | McGill | |
| 9,805,370 B1 | 10/2017 | Quigley et al. | |
| 9,892,293 B1 | 2/2018 | Wade et al. | |
| 10,366,378 B1 | 7/2019 | Han et al. | |
| 10,552,846 B2 | 2/2020 | Caton et al. | |
| 10,867,297 B2 | 12/2020 | Martinez de Velasco Cortina et al. | |
| 10,878,418 B2 | 12/2020 | Hamilton et al. | |
| 10,915,906 B2 | 2/2021 | Keith | |
| 11,182,794 B1 | 11/2021 | Aument | |
| 11,320,588 B1 | 5/2022 | Mazed | |
| 2018/0260553 A1 | 9/2018 | Hoyos et al. | |
| 2020/0167775 A1 | 5/2020 | Reese et al. | |
| 2023/0082200 A1 | 3/2023 | Ozvat et al. | |

*Primary Examiner* — Ryan J Jakovac

(57) ABSTRACT

A device, during a first interaction in real time, accesses from optical cells a measurement of optical emissions generated by hardware components inside the device responsive to a data card interacting with the device, generates a first optical emission pattern based on the measurement, determines whether the first optical emission pattern matches a baseline optical emission pattern, upon determining a match, determines whether the data card is associated with prohibited interactions, upon determining the first data card is not associated with prohibited transactions, determines whether the device is connected to a malicious IP address, upon determining the device is not connected to a malicious IP address, approves the first interaction. The device declines the first interaction if the first optical emission pattern does not match the baseline optical emission pattern, the first data card is associated with prohibited interactions, or the device is connected to a malicious IP address.

20 Claims, 3 Drawing Sheets

SYSTEM AND METHOD FOR IMPROVING DEVICE SECURITY BASED ON OPTICAL ABSORPTION SPECTROSCOPY AND ARTIFICIAL INTELLIGENCE

TECHNICAL FIELD

The present disclosure relates generally to data and device securities, and more specifically, to a system and method for improving device security based on optical absorption spectroscopy and artificial intelligence.

BACKGROUND

Security risks exist during interactions between data cards and interaction processing devices. When a user uses a data card to initiate an interaction at an interaction processing device, there is no understanding of if the device is malfunctioned or if any malware has been introduced into the device. At the same time, there is no understanding of if the data card has ever been reported for prohibited interactions. In addition, during the interaction, there is no understanding of if there has been any tampering of the device from the Internet.

SUMMARY

The present application provides a technical solution of improving the security of interaction processing by performing multiple security checks on the hardware of an interaction processing device, a data card, and the network connections of the interaction processing device. In particular embodiments, a smart chip based on artificial intelligence (AI) technologies can be implemented in an interaction processing device. When a data card is presented to the interaction processing device for an interaction, the smart chip verifies the interaction processing device and the data card both for any prohibited interactions. The smart chip uses optical absorption spectroscopy to analyze the optical emission pattern generated by hardware components of the interaction processing device during the interaction to validate the interaction processing device for any additional malicious hardware introduced to the interaction processing device or any tampering at the interaction processing device. The smart chip also verifies the data card for any previously reported prohibited interactions on it. The smart chip further checks a local data cache storing malicious IP addresses for reconciliation or negative IP check. Based on these security checks, if there is any feasibility of a prohibited interaction, the smart chip can cancel the interaction and disable the interaction processing device for interaction processing. As can be seen, the embodiments disclosed herein have a technical advantage of reducing probabilities of any prohibited interactions at interaction processing devices.

In one embodiment, the disclosed device for secured interaction processing includes a memory operable to store a baseline optical emission pattern representing a secured operation for interaction processing and a plurality of known malicious IP addresses. The disclosed device further includes a smart chip operably coupled to the memory. The smart chip comprises one or more optical cells configured to measure optical emissions from hardware components inside the device and a processor. The processor is configured to access a first measurement of first optical emissions from the one or more optical cells during a first interaction in real time. In particular, the first optical emissions are generated by one or more first hardware components inside the device responsive to an interaction between a first data card and the device during the first interaction. The processor is then configured to generate a first optical emission pattern based on the first measurement of the first optical emissions during the first interaction in real time. The processor is then configured to determine whether the first optical emission pattern matches the baseline optical emission pattern based on a comparison between the first optical emission pattern and the baseline optical emission pattern during the first interaction in real time. If the first optical emission pattern does not match the baseline optical emission pattern, the processor is configured to decline the first interaction. If the first optical emission pattern matches the baseline optical emission pattern, the processor is configured to identify card information associated with the first data card and determine whether the first data card is associated with one or more prohibited interactions based on the card information during the first interaction in real time. If the first data card is associated with one or more prohibited interactions, the processor is configured to decline the first interaction. If the first data card is not associated with one or more prohibited transactions, the processor is configured to access the plurality of known malicious IP addresses from the memory and determine whether the device is connected to any one of the plurality of known malicious IP addresses during the first interaction in real time. If the device is connected to any one of the plurality of known malicious IP addresses, the processor is configured to decline the first interaction. If the device is not connected to any one of the plurality of known malicious IP addresses, the processor is configured to approve the first interaction.

The processor of the disclosed device is further configured to determine, based on the first optical emission pattern not matching the baseline optical emission pattern, one or more of one or more prohibited malicious hardware components are installed to the device, or one or more hardware components of the device are tampered.

In one embodiment, the baseline optical emission pattern indicates a baseline absorption of optical radiation by one or more secured hardware components inside the device when being interacted with a secured data card during a secured interaction. The first optical emission pattern indicates a first absorption of optical radiation by the one or more first hardware components inside the device when being interacted with the first data card during the first interaction. In one embodiment, generating the first optical emission pattern includes applying optical absorption spectroscopy to the measurement of the first optical emissions. Accordingly, determining whether the first optical emission pattern matches the baseline optical emission pattern includes comparing the first absorption of optical radiation with the baseline absorption of optical radiation.

The first data card may be issued by a first institution. In one embodiment, determining whether the first data card is associated with one or more prohibited interactions includes transmitting a request to a server associated with the first institution to validate the first data card against one or more reports associated with prohibited interactions. The request may include the card information. Determining whether the first data card is associated with one or more prohibited interactions further includes receiving a response indicating whether the first data card is associated with one or more prohibited interactions from the server associated with the first institution. In another embodiment, determining whether the first data card is associated with one or more prohibited interactions includes accessing historical interaction data associated with the first data card from a server associated with the first institution. Determining whether the first data card is associated with one or more prohibited interactions further includes determining a probability indicating whether the first data card is associated with one or more prohibited interactions based on the historical interaction data by one or more machine-learning models configured for detecting prohibited interactions.

In one embodiment, determining whether the device is connected to any one of the plurality of known malicious IP addresses includes accessing network data associated with the device, identifying one or more IP addresses in communication with the device based on the network data, and comparing the one or more IP addresses with the plurality of known malicious IP addresses. In this case, the processor is further configured to determine one or more malicious entities associated with the plurality of known malicious IP addresses based on one or more machine-learning models configured for risk detection, determine one or more first IP addresses of the one or more IP addresses are associated with one or more of the malicious entities, determine the device is in a risk of being connected to malicious IP addresses, and update the plurality of known malicious IP addresses to include the one or more first IP addresses in the memory.

In one embodiment, declining the first interaction includes disabling the device for interaction processing.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
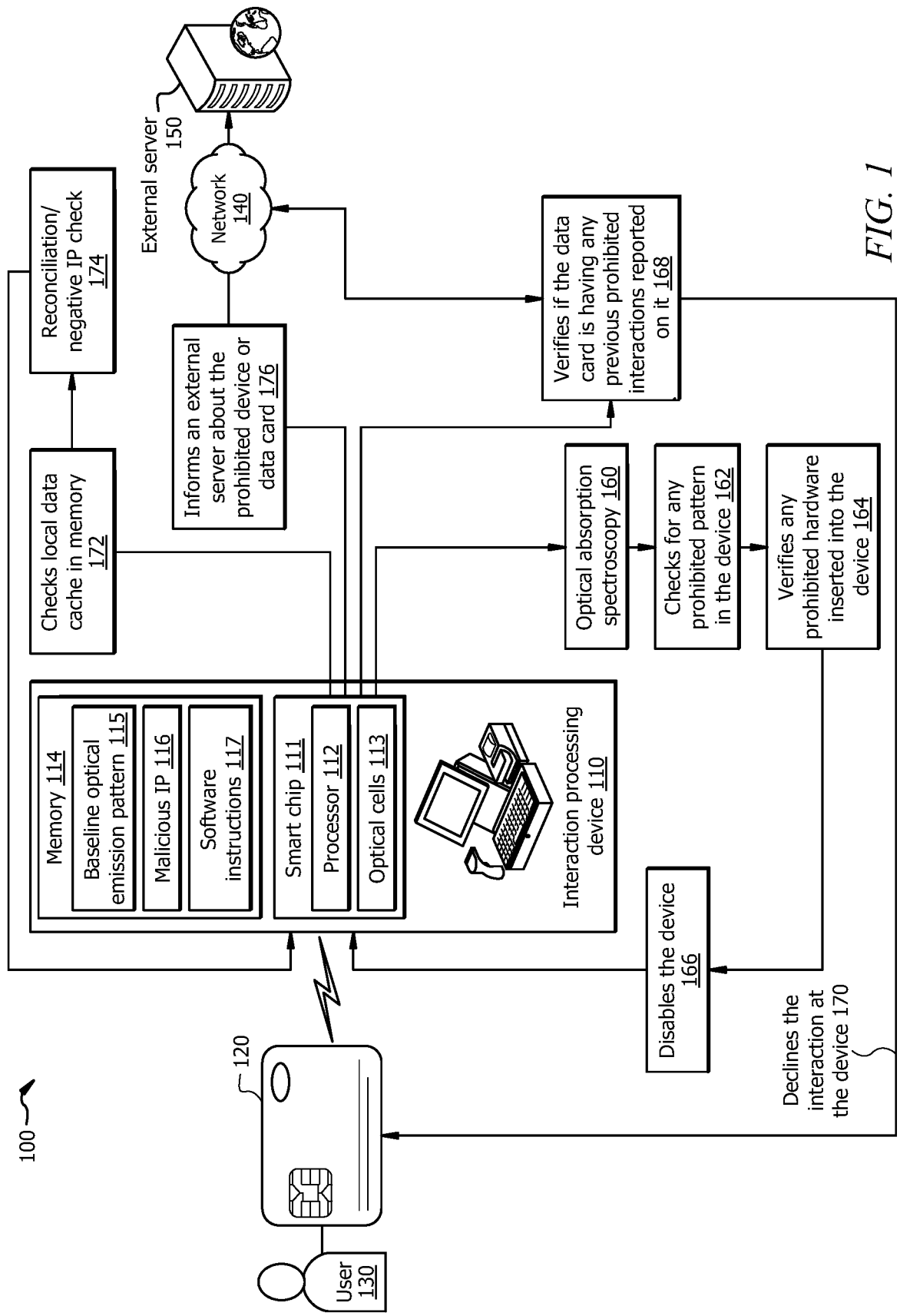
FIG. 1 illustrates one example system for secured interaction processing.
Figure 2A:
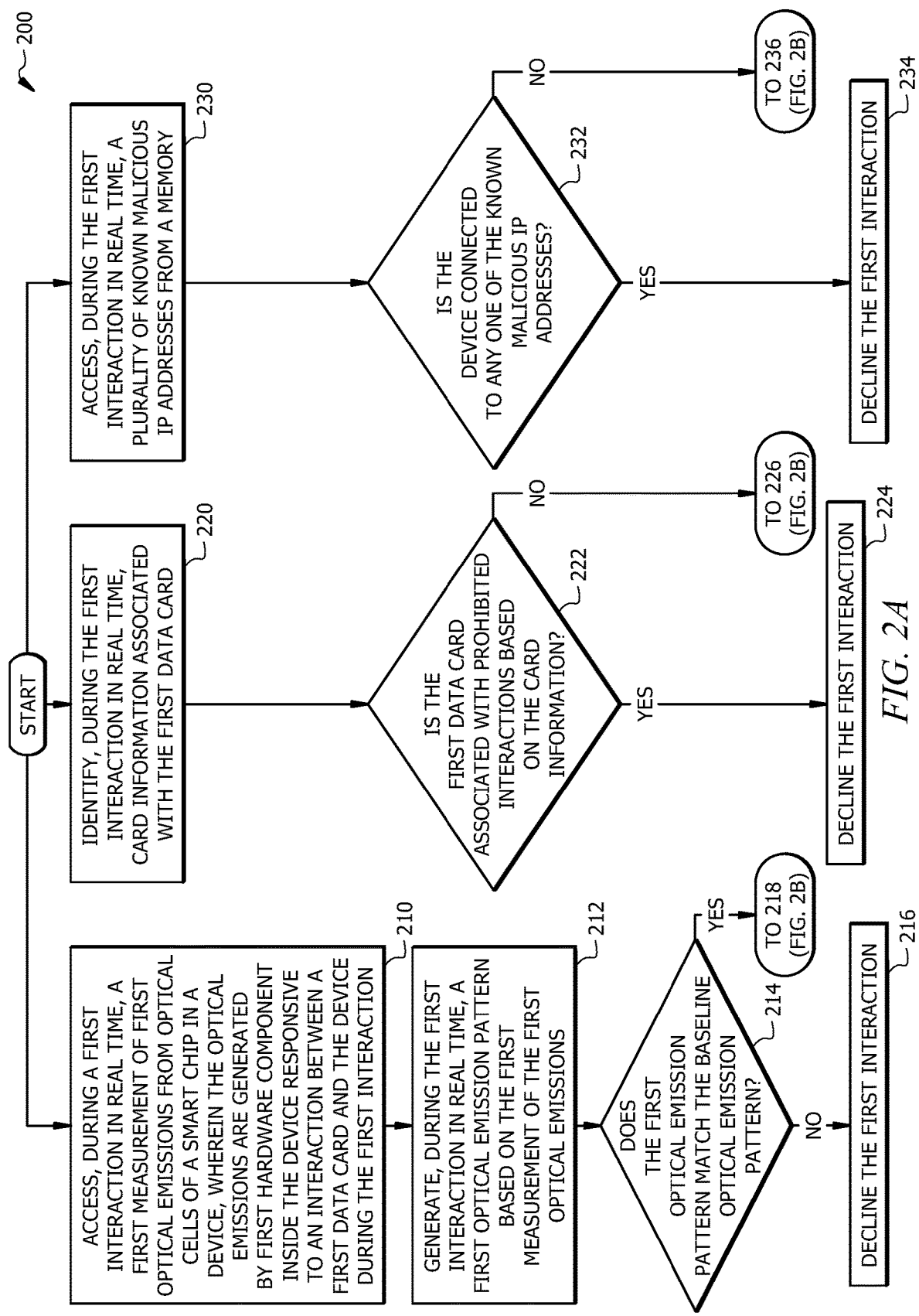
FIGS. 2A-2B illustrate an example flowchart of a method for secured interaction processing.
Figure 2B:
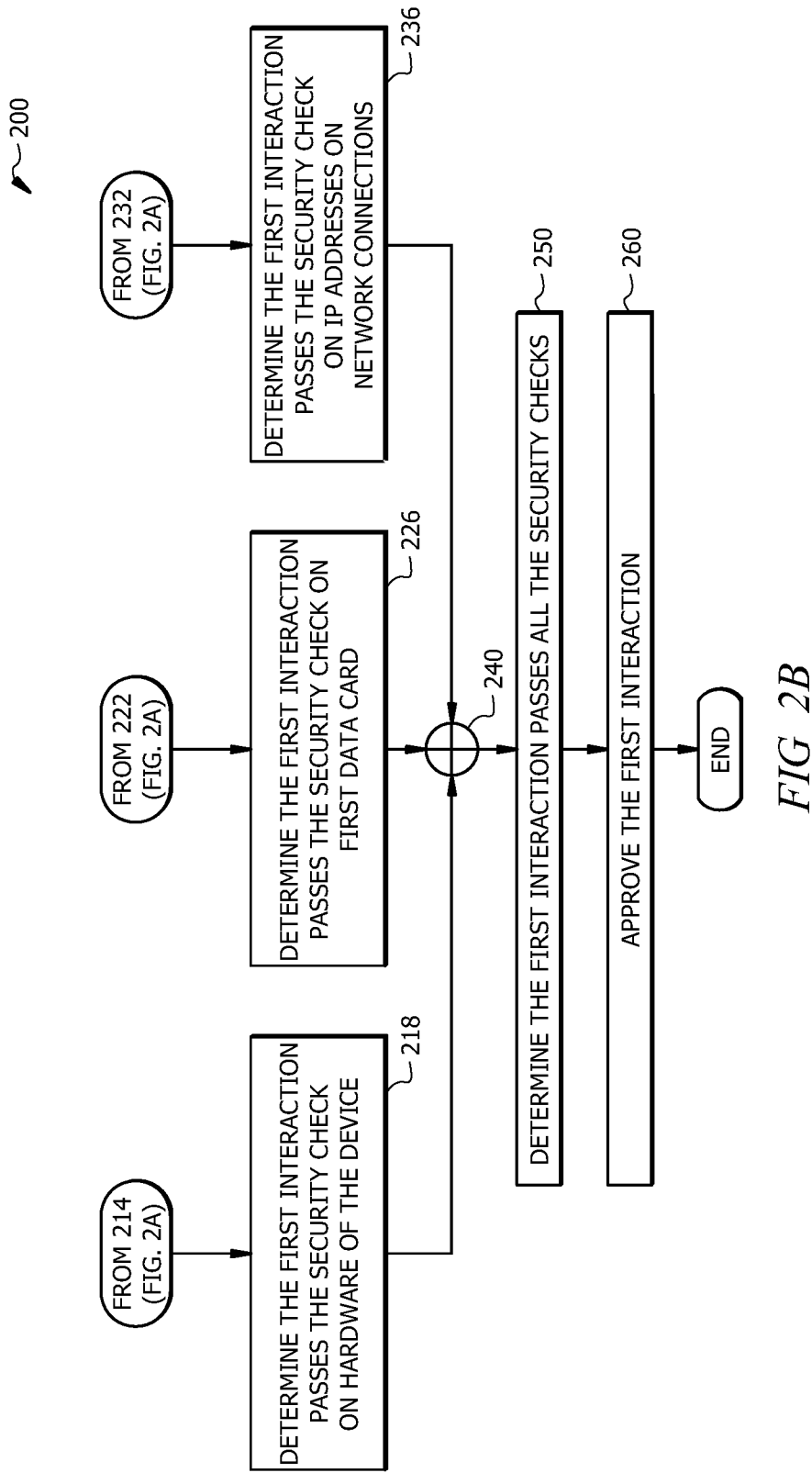

As described above, previous technologies are limited in reducing security risks in interaction processing involving both the interaction processing device and the data card. This disclosure provides various systems and methods to improve the security of interaction processing by performing multiple security checks on the hardware of an interaction processing device, a data card, and the network connections of the interaction processing device. FIG. 1 illustrates a system 100 configured to conduct secured interacting processing. FIGS. 2A-2B illustrate a method 200 configured to conduct secured interaction processing.

Example System for Secured Interaction Processing

FIG. 1 illustrates one example system 100 for secured interaction processing. In one embodiment, system 100 comprises an interaction processing device 110. In some embodiments, system 100 additionally comprises a data card 120 which may be used by a user 130 to conduct interactions via the interaction processing device 110. In some embodiments, system 100 further comprises a network 140 and an entity server 150. Network 140 enables communications between the interaction processing device 110 and the entity server 150. In other embodiments, system 100 may not have all of the components listed and/or may have other elements instead of, or in addition to, those listed above.

The interaction processing device 110 comprises a smart chip 111, which comprises a processor 112 and one or more optical cells 113. In particular embodiments, an optical cell 113 may comprise a photonic chip, i.e., a photonic integrated circuit. The optical cell 113 may comprise photonic components which form a functioning circuit to detect, generate, transport, and process light. The optical cell 113 may utilize photons (or particles of light) to provide functions for information signals imposed on optical wavelengths. As an example and not by way of limitation, the optical cell 113 may be made using Indium phosphide, silicon nitride, silicon photonics, Lithium niobate, silica, or Gallium arsenide. The interaction processing device 110 further comprises a memory 114. The processor 112 is in signal communication with the memory 114. Memory 114 may store a baseline optical emission pattern 115 representing a secured operation for interaction processing. Memory 114 may also store a plurality of known malicious IP addresses 116. Memory 114 may further store software instructions 117 that when executed by the processor 112, cause the processor 112 to perform one or more functions described herein. For example, when the software instructions 117 are executed by processor 112, the processor 112 performs a number of operations, including: access a first measurement of first optical emissions from the one or more optical cells 113 during a first interaction in real time; generate a first optical emission pattern based on the first measurement of the first optical emissions during the first interaction in real time; determine whether the first optical emission pattern matches the baseline optical emission pattern 115, whether the first data card 120 is associated with one or more prohibited interactions based on the card information during the first interaction in real time, whether the interaction processing device 110 is connected to any one of the plurality of known malicious IP addresses 116 during the first interaction in real time; and decline the first interaction if any of the above security checks fails or approve the first interaction if all of the above security checks pass.

System Components

Interaction Processing Device

The interaction processing device 110 is generally any device that is configured to process data and communicate with data cards (e.g., data card 120) via wireless or wired communications such as near field communication, and with computing devices (e.g., entity server 150), databases, systems, etc., via the network 140. The interaction processing device 110 is generally configured to perform operations described further below in conjunction with method 200 described in FIGS. 2A-2B. As an example and not by way of limitation, the interaction processing device 110 may be a POS machine.

The interaction processing device 110 comprises a smart chip 111 operably coupled to the memory 114. The smart chip 111 is AI based which uses capabilities of optical absorption spectroscopy. In particular embodiments, "AI based" means the smart chip 111 may comprise hardware (e.g., graphics processing units and small transistors) specialized to handle AI tasks, e.g., by executing AI models to perform different functions disclosed herein. The architecture of the smart chip 111 may be designed particularly to handle AI tasks with improved efficiency and reduced consumption of computing resources. The smart chip 111 verifies both the interaction processing device 110 and the data card 120 for any prohibited interactions. The smart chip 111 comprises one or more optical cells 113 configured to measure optical emissions from hardware components inside the interaction processing device 110. The smart chip 111 further comprises the processor 112, which is in signal communication with the optical cells 113, the memory 114, and a network interface associated with network 140. The interaction processing device 110 may be configured as shown, or in any other configuration.

Processor 112 comprises one or more processors. The processor 112 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 112 may be a programmable logic device, a microcontroller, a microprocessor, or any suitable combination of the preceding. The processor 112 is communicatively coupled to and in signal communication with the optical cells 113, the memory 114, and a network interface associated with network 140. The one or more processors 112 are configured to process data and may be implemented in hardware or software. For example, the processor 112 may be 8-bit, 16-bit, 32-bit, 64-bit or of any other suitable architecture. The processor 112 may include an arithmetic logic unit (ALU) for performing arithmetic and logic operations, processor registers that supply operands to the ALU and store the results of ALU operations, and a control unit that fetches software instructions 117 from memory 114 and executes them by directing the coordinated operations of the ALU, registers and other components. The one or more processors 112 are configured to implement various instructions. For example, the one or more processors 112 are configured to execute software instructions 117 to implement the functions disclosed herein, such as some or all of those described with respect to FIGS. 1-2. In some embodiments, the function described herein is implemented using logic units, FPGAs, ASICs, DSPs, or any other suitable hardware or electronic circuitry.

Memory 114 may be volatile or non-volatile and may comprise a read-only memory (ROM), random-access memory (RAM), ternary content-addressable memory (TCAM), dynamic random-access memory (DRAM), and static random-access memory (SRAM). Memory 114 may be implemented using one or more disks, tape drives, solid-state drives, and/or the like. Memory 114 is operable to store a baseline optical emission pattern 115 representing a secured operation for interaction processing, known malicious IP addresses 116, and the software instructions 117, and/or any other data or instructions. The software instructions 117 may comprise any suitable set of instructions, logic, rules, or code operable to execute the processor 112.

In an example scenario, assume that a data card 120 is used to request processing an interaction via the interaction processing device 110. The data card 120 may be inserted into the interaction processing device 110, tapped on the interaction processing device 110, or presented in proximity to the interaction processing device 110. The interaction processing device 110 processes the request and determines whether the interaction should be approved.

Data Card

A data card 120 may belong to a user 130 and may be registered with the entity server 150. As shown in FIG. 1, the data card 120 may be presented to the interaction processing device 110 to initiate an interaction. The data card 120 may include card information relating to data interactions. The data card 120 may be configured to exchange data (e.g., transmit data or receive data) with the interaction processing device 110 over a peer-to-peer connection (e.g., Bluetooth, near-field communication, etc.).

Network

Network 140 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 140 may be configured to support any suitable type of communication protocol as would be appreciated by one of ordinary skill in the art.

Entity Server

The system 100 further comprises an entity server 150 in signal communication with the interaction processing device 110. For example, the entity server 150 may receive interaction data that is associated with an interaction performed by the data card 120 on the interaction processing device 110.

Operational Flow

An example operational flow for secured interaction processing using the system 100 may be as follows.

When a data card 120 is presented to the interaction processing device 110 during an interaction, one or more hardware components inside the interaction processing device 110 generates optical emissions responsive to the interaction between the data card 120 and the interaction processing device 110 during the interaction. The processor 112 accesses the measurement of the optical emissions from the optical cells 113 during the interaction in real time. The processor 112 then applies optical absorption spectroscopy 160 to generate an optical emission pattern based on the measurement of the optical emissions.

At operation 162, the processor 112 checks for any prohibited pattern in the interaction processing device 110. In this process, the processor 112 may analyze the interaction processing device 110 based on the light intensity using optical absorption spectroscopy. If there is any additional hardware attached to the interaction processing device 110 or the hardware of the interaction processing device 110 is tampered, the processor 112 can sense it because of changes of the light intensity using optical absorption spectroscopy. In particular embodiments, the processor 112 may determine, during the first interaction in real time, whether the first optical emission pattern matches the baseline optical emission pattern 115 based on a comparison between the first optical emission pattern and the baseline optical emission pattern 115. In particular embodiments, the baseline optical emission pattern 115 may indicate a baseline absorption of optical radiation by one or more secured hardware components inside the interaction processing device 110 when being interacted with a secured data card 120 during a secured interaction, whereas the first optical emission pattern may indicate a first absorption of optical radiation by the one or more first hardware components inside the interaction processing device 110 when being interacted with the first data card 120 during the first interaction. Accordingly, determining whether the first optical emission pattern matches the baseline optical emission pattern 115 may include comparing the first absorption of optical radiation with the baseline absorption of optical radiation.

At operation 164, the processor 112 verifies any prohibited hardware inserted into the interaction processing device 110 if the first optical emission pattern does not match the baseline optical emission pattern 115.

At operation 166, the processor 112 then disables the interaction processing device 110 for processing the first transaction.

At operation 168, the processor 112 also verifies if the data card 120 is having any previous prohibited interactions reported on it. In one embodiment, operation 168 may be after operations 162-166. In another embodiment, operation 168 may be parallel to operations 162-166. In particular embodiments, verifying if the data card 120 is having any previous prohibited interactions reported on it may include communication with the entity server 150, which may be a server 150 associated with the first institution that issued the first data card 120. The processor 112 may transmit, to the server 150 associated with the first institution, a request to validate the first data card 120 against one or more reports associated with prohibited interactions. The request may include the card information. The processor 112 may then receive, from the server 150 associated with the first institution, a response indicating whether the first data card 120 is associated with one or more prohibited interactions. In alternative embodiments, the processor 112 may access, from the server 150 associated with the first institution, historical interaction data associated with the first data card 120. The processor 112 may then determine, based on the historical interaction data by one or more machine-learning models configured for detecting prohibited interactions, a probability indicating whether the first data card 120 is associated with one or more prohibited interactions.

At operation 170, the processor 112 declines the interaction at the interaction processing device 110 if the data card 120 is having any previous prohibited interactions reported on it.

At operation 172, the processor 112 checks local data cache in memory 114. At operation 174, the processor 112 performs reconciliation or negative IP check to determine whether the interaction processing device 110 is connected to any known malicious IP address 116 during the first interaction in real time. In this process, the processor 112 may access network data associated with the interaction processing device 110. The processor 112 may then identify, based on the network data, one or more IP addresses in communication with the interaction processing device 110. The processor 112 may further compare the one or more IP addresses with the plurality of known malicious IP addresses 116. In particular embodiments, the processor 112 may determine, based on one or more machine-learning models configured for risk detection, one or more malicious entities associated with the plurality of known malicious IP addresses 116. The processor 112 may then determine one or more first IP addresses of the one or more IP addresses are associated with one or more of the malicious entities. The processor 112 may then determine the interaction processing device 110 is in a risk of being connected to malicious IP addresses. The processor 112 may further update the plurality of known malicious IP addresses 116 to include the one or more first IP addresses in the memory 114.

In one embodiment, operations 172-174 may be after operations 162-170. In another embodiment, operations 172-174 may be after operations 162-166 but parallel to operations 168-170. In another embodiment, operations 172-174 may be parallel to operations 162-170.

At operation 176, the processor 112 informs the entity server 150 about the prohibited interaction processing device 110 or the data card 120. The entity server 150 may be the server 150 associated with the first institution.

In one example embodiment, the system 100 may be used to improve the security for transactions on transaction processing devices, e.g., POS machines. For example, when a user makes a payment at the merchant POS machine using a payment card, there is no information on whether the POS machine is malfunctioned or if any malware has been introduced into it. At the same time, if the payment card has been reported for fraudulent transactions, that information is also not captured in real time during the transaction. During the transaction, the information of any network tampering of the payment is also not captured in real time. With the disclosed system 100, the processor 112 verifies the POS machine, the payment card, and the network for any fraudulent activities. If there is any feasibility of fraud, the transaction is cancelled and the POS machine is disabled for merchant payment, thereby increasing the security of the transaction.

Example Method for Improving Device Security

FIGS. 2A-2B illustrate an example flowchart of a method 200 for secured interaction processing. Modifications, additions, or omissions may be made to method 200. Method 200 may include more, fewer, or other operations. For example, operations may be performed in parallel or in any suitable order. While at times discussed as the interaction processing device 110, data card 120, entity server 150, processor 112, or components of any of thereof performing operations, any suitable system or components of the system may perform one or more operations of the method 200. For example, one or more operations of method 200 may be implemented, at least in part, in the form of software instructions 117, stored on non-transitory, tangible, machine-readable media (e.g., memory 114 of FIG. 1) that when run by one or more processors (e.g., processor 112 of FIG. 1) may cause the one or more processors to perform operations 210-260.

Now referring to FIG. 2A, after start, the processor 112 of the smart chip 111 accesses, during a first interaction in real time, a first measurement of first optical emissions from optical cells 113 of the smart chip 111 in an interaction processing device 110. The optical emissions are generated by first hardware component inside the interaction processing device 110 responsive to an interaction between a first data card 120 and the interaction processing device 110 during the first interaction at operation 210.

At operation 212, the processor 112 generates, during the first interaction in real time, a first optical emission pattern based on the first measurement of the first optical emissions.

At operation 214, the processor 112 determines whether the first optical emission pattern matches the baseline optical emission pattern 115. If the first optical emission pattern does not match the baseline optical emission pattern 115, the processor 112 declines the first interaction at operation 216. If the first optical emission pattern matches the baseline optical emission pattern 115, method 200 proceeds to operation 218, as illustrated in FIG. 2B.

Now referring to FIG. 2B, at operation 218, the processor 112 determines the first interaction passes the security check on hardware of the interaction processing device 110 if the first optical emission pattern matches the baseline optical emission pattern 115.

In particular embodiments, parallel or sequential to operations 210-218, method 200 may perform operations 220-226. Referring back to FIG. 2A, at operation 220, the processor 112 identifies, during the first interaction in real time, card information associated with the first data card 120.

At operation 222, the processor 112 determines whether the first data card 120 is associated with prohibited interactions based on the card information. If the first data card 120 is associated with prohibited interactions, the processor 112 declines the first interaction at operation 224. If the first data card 120 is not associated with prohibited interactions, method 200 proceeds to operation 226, as illustrated in FIG. 2B.

Now referring again to FIG. 2B, at operation 226, the processor 112 determines the first interaction passes the security check on the first data card 120 if the first data card 120 is not associated with prohibited interactions.

In particular embodiments, parallel or sequential to operations 220-226, method 200 may perform operations 230-236. Referring back to FIG. 2A, at operation 230, the processor 112 accesses, during the first interaction in real time, a plurality of known malicious IP addresses 116 from a memory 114.

At operation 232, the processor 112 determines whether the interaction processing device 110 is connected to any one of the known malicious IP addresses 116. If the interaction processing device 110 is connected to any one of the known malicious IP addresses 116, the processor 112 declines the first interaction at operation 234. If the interaction processing device 110 is not connected to any one of the known malicious IP addresses 116, method 200 proceeds to operation 236, as illustrated in FIG. 2B.

Now referring again to FIG. 2B, at operation 236, the processor 112, the processor 112 determines the first interaction passes the security check on IP addresses on network connections if the interaction processing device 110 is not connected to any one of the known malicious IP addresses 116.

After operations 218, 226, and 236, the processor 112 consolidates results of passing security checks on hardware of the interaction processing device 110, first data card 120, and IP addresses on network connections at operation 240.

At operation 250, the processor 112 determines the first interaction passes all the security checks.

At operation 260, the processor 112 approves the first interaction.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device for secured interaction processing, comprising:
    a memory operable to store:
        a baseline optical emission pattern representing a secured operation for interaction processing; and
        a plurality of known malicious IP addresses; and
    a smart chip, operably coupled to the memory, comprising:
        one or more optical cells configured to measure optical emissions from hardware components inside the device; and
        a processor configured to:
            access, from the one or more optical cells during a first interaction in real time, a first measurement of first optical emissions, the first optical emissions being generated by one or more first hardware components inside the device responsive to an interaction between a first data card and the device during the first interaction;
            generate, during the first interaction in real time, a first optical emission pattern based on the first measurement of the first optical emissions;
            determine, during the first interaction in real time, whether the first optical emission pattern matches the baseline optical emission pattern based on a comparison between the first optical emission pattern and the baseline optical emission pattern; and
            based on determining whether the first optical emission pattern matches the baseline optical emission pattern:
                if the first optical emission pattern does not match the baseline optical emission pattern:
                    decline the first interaction; else
                if the first optical emission pattern matches the baseline optical emission pattern:
                    identify, during the first interaction in real time, card information associated with the first data card; and
                    determine, during the first interaction in real time, whether the first data card is associated with one or more prohibited interactions based on the card information; and
                    based on determining whether the first data card is associated with one or more prohibited interactions:
                        if the first data card is associated with one or more prohibited interactions:
                            decline the first interaction; else
                        if the first data card is not associated with one or more prohibited transactions:
                            access, during the first interaction in real time, the plurality of known malicious IP addresses from the memory; and
                            determine, during the first interaction in real time, whether the device is connected to any one of the plurality of known malicious IP addresses; and
                            based on determining whether the device is connected to any one of the plurality of known malicious IP addresses:
                              if the device is connected to any one of the plurality of known malicious IP addresses:

decline the first interaction;
else
 if the device is not connected to any one of the plurality of known malicious IP addresses:
  approve the first interaction.

2. The device of claim 1, wherein the baseline optical emission pattern indicates a baseline absorption of optical radiation by one or more secured hardware components inside the device when being interacted with a secured data card during a secured interaction, wherein the first optical emission pattern indicates a first absorption of optical radiation by the one or more first hardware components inside the device when being interacted with the first data card during the first interaction, and wherein determining whether the first optical emission pattern matches the baseline optical emission pattern comprises:
 comparing the first absorption of optical radiation with the baseline absorption of optical radiation.

3. The device of claim 1, wherein generating the first optical emission pattern comprises:
 applying optical absorption spectroscopy to the first measurement of the first optical emissions.

4. The device of claim 1, wherein the first data card is issued by a first institution, and wherein determining whether the first data card is associated with one or more prohibited interactions comprises:
 transmitting, to a server associated with the first institution, a request to validate the first data card against one or more reports associated with prohibited interactions, wherein the request comprises the card information; and
 receiving, from the server associated with the first institution, a response indicating whether the first data card is associated with one or more prohibited interactions.

5. The device of claim 1, wherein the first data card is issued by a first institution, and wherein determining whether the first data card is associated with one or more prohibited interactions comprises:
 accessing, from a server associated with the first institution, historical interaction data associated with the first data card; and
 determining, based on the historical interaction data by one or more machine-learning models configured for detecting prohibited interactions, a probability indicating whether the first data card is associated with one or more prohibited interactions.

6. The device of claim 1, wherein determining whether the device is connected to any one of the plurality of known malicious IP addresses comprises:
 accessing network data associated with the device;
 identifying, based on the network data, one or more IP addresses in communication with the device; and
 comparing the one or more IP addresses with the plurality of known malicious IP addresses.

7. The device of claim 6, wherein the processor is further configured to:
 determine, based on one or more machine-learning models configured for risk detection, one or more malicious entities associated with the plurality of known malicious IP addresses;
 determine one or more first IP addresses of the one or more IP addresses are associated with one or more of the malicious entities;
 determine the device is in a risk of being connected to malicious IP addresses; and
 update the plurality of known malicious IP addresses to include the one or more first IP addresses in the memory.

8. The device of claim 1, wherein the processor is further configured to:
 determine, based on the first optical emission pattern not matching the baseline optical emission pattern, one or more of:
  one or more prohibited malicious hardware components are installed to the device; or
  one or more hardware components of the device are tampered.

9. The device of claim 1, wherein declining the first interaction comprises disabling the device for interaction processing.

10. A method comprising, by one or more computing systems:
 accessing, from one or more optical cells configured to measure optical emissions from hardware components inside a device for secured interaction processing during a first interaction in real time, a first measurement of first optical emissions, the first optical emissions being generated by one or more first hardware components inside the device responsive to an interaction between a first data card and the device during the first interaction, wherein the one or more optical cells are in a smart chip of the device, wherein the smart chip is operably coupled to a memory of the device, and wherein the memory is operable to store a baseline optical emission pattern representing a secured operation for interaction processing and a plurality of known malicious IP addresses;
 generating, during the first interaction in real time, a first optical emission pattern based on the first measurement of the first optical emissions;
 determining, during the first interaction in real time, whether the first optical emission pattern matches the baseline optical emission pattern based on a comparison between the first optical emission pattern and the baseline optical emission pattern; and
 based on determining whether the first optical emission pattern matches the baseline optical emission pattern:
  if the first optical emission pattern does not match the baseline optical emission pattern:
   declining the first interaction; else if the first optical emission pattern matches the baseline optical emission pattern:
   identifying, during the first interaction in real time, card information associated with the first data card; and
   determining, during the first interaction in real time, whether the first data card is associated with one or more prohibited interactions based on the card information; and
   based on determining whether the first data card is associated with one or more prohibited interactions:
    if the first data card is associated with one or more prohibited interactions:
     declining the first interaction; else
    if the first data card is not associated with one or more prohibited transactions:
     accessing, during the first interaction in real time, the plurality of known malicious IP addresses from the memory; and determining, during the first interaction in real time, whether the device is connected to any one of the plurality of known malicious IP addresses; and based on determining whether the device is connected to any one of the plurality of known malicious IP addresses:

if the device is connected to any one of the plurality of known malicious IP addresses:
declining the first interaction; else
if the device is not connected to any one of the plurality of known malicious IP addresses:
approving the first interaction.

11. The method of claim 10, wherein the baseline optical emission pattern indicates a baseline absorption of optical radiation by one or more secured hardware components inside the device when being interacted with a secured data card during a secured interaction, wherein the first optical emission pattern indicates a first absorption of optical radiation by the one or more first hardware components inside the device when being interacted with the first data card during the first interaction, and wherein determining whether the first optical emission pattern matches the baseline optical emission pattern comprises:
comparing the first absorption of optical radiation with the baseline absorption of optical radiation.

12. The method of claim 10, wherein generating the first optical emission pattern comprises:
applying optical absorption spectroscopy to the first measurement of the first optical emissions.

13. The method of claim 10, wherein the first data card is issued by a first institution, and wherein determining whether the first data card is associated with one or more prohibited interactions comprises:
transmitting, to a server associated with the first institution, a request to validate the first data card against one or more reports associated with prohibited interactions, wherein the request comprises the card information; and
receiving, from the server associated with the first institution, a response indicating whether the first data card is associated with one or more prohibited interactions.

14. The method of claim 10, wherein the first data card is issued by a first institution, and wherein determining whether the first data card is associated with one or more prohibited interactions comprises:
accessing, from a server associated with the first institution, historical interaction data associated with the first data card; and
determining, based on the historical interaction data by one or more machine-learning models configured for detecting prohibited interactions, a probability indicating whether the first data card is associated with one or more prohibited interactions.

15. The method of claim 10, wherein determining whether the device is connected to any one of the plurality of known malicious IP addresses comprises:
accessing network data associated with the device;
identifying, based on the network data, one or more IP addresses in communication with the device; and
comparing the one or more IP addresses with the plurality of known malicious IP addresses.

16. A non-transitory computer-readable medium storing instructions that when executed by a processor cause the processor to:
access, from one or more optical cells configured to measure optical emissions from hardware components inside a device for secured interaction processing during a first interaction in real time, a first measurement of first optical emissions, the first optical emissions being generated by one or more first hardware components inside the device responsive to an interaction between a first data card and the device during the first interaction, wherein the one or more optical cells are in a smart chip of the device, wherein the smart chip is operably coupled to a memory of the device, and wherein the memory is operable to store a baseline optical emission pattern representing a secured operation for interaction processing and a plurality of known malicious IP addresses;

generate, during the first interaction in real time, a first optical emission pattern based on the first measurement of the first optical emissions;

determine, during the first interaction in real time, whether the first optical emission pattern matches the baseline optical emission pattern based on a comparison between the first optical emission pattern and the baseline optical emission pattern; and based on determining whether the first optical emission pattern matches the baseline optical emission pattern:
if the first optical emission pattern does not match the baseline optical emission pattern:
decline the first interaction; else
if the first optical emission pattern matches the baseline optical emission pattern:
identify, during the first interaction in real time, card information associated with the first data card; and
determine, during the first interaction in real time, whether the first data card is associated with one or more prohibited interactions based on the card information; and
based on determining whether the first data card is associated with one or more prohibited interactions:
if the first data card is associated with one or more prohibited interactions:
decline the first interaction; else
if the first data card is not associated with one or more prohibited transactions:
access, during the first interaction in real time, the plurality of known malicious IP addresses from the memory; and
determine, during the first interaction in real time, whether the device is connected to any one of the plurality of known malicious IP addresses; and
based on determining whether the device is connected to any one of the plurality of known malicious IP addresses:
if the device is connected to any one of the plurality of known malicious IP addresses:
decline the first interaction; else
if the device is not connected to any one of the plurality of known malicious IP addresses:
approve the first interaction.

17. The non-transitory computer-readable medium of claim 16, wherein the baseline optical emission pattern indicates a baseline absorption of optical radiation by one or more secured hardware components inside the device when being interacted with a secured data card during a secured interaction, wherein the first optical emission pattern indicates a first absorption of optical radiation by the one or more first hardware components inside the device when being interacted with the first data card during the first interaction, and wherein determining whether the first optical emission pattern matches the baseline optical emission pattern comprises:
comparing the first absorption of optical radiation with the baseline absorption of optical radiation.

18. The non-transitory computer-readable medium of claim 16, wherein generating the first optical emission pattern comprises:
applying optical absorption spectroscopy to the first measurement of the first optical emissions.

19. The non-transitory computer-readable medium of claim 16, wherein the first data card is issued by a first institution, and wherein determining whether the first data card is associated with one or more prohibited interactions comprises:
transmitting, to a server associated with the first institution, a request to validate the first data card against one or more reports associated with prohibited interactions, wherein the request comprises the card information; and
receiving, from the server associated with the first institution, a response indicating whether the first data card is associated with one or more prohibited interactions.

20. The non-transitory computer-readable medium of claim 16, wherein the first data card is issued by a first institution, and wherein determining whether the first data card is associated with one or more prohibited interactions comprises:
accessing, from a server associated with the first institution, historical interaction data associated with the first data card; and
determining, based on the historical interaction data by one or more machine-learning models configured for detecting prohibited interactions, a probability indicating whether the first data card is associated with one or more prohibited interactions.

* * * * *